3,422,956
WASH FLOW

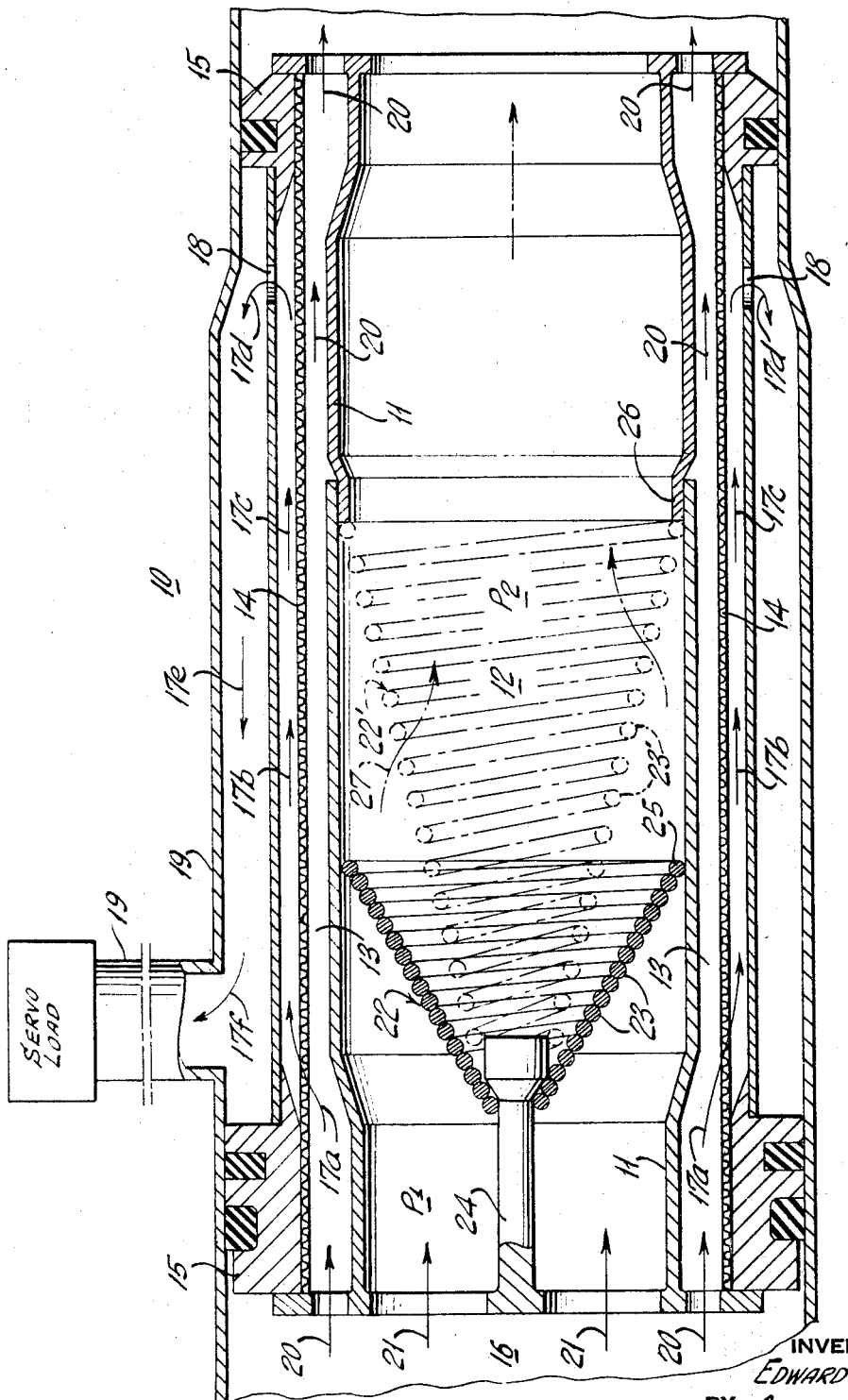

Edward H. Hadden, Granby, Conn., assignor to United Aircraft Corporation, East Hartford, Conn., a corporation of Delaware
Filed Dec. 1, 1966, Ser. No. 598,323
U.S. Cl. 210—106  2 Claims
Int. Cl. B01d 35/16

ABSTRACT OF THE DISCLOSURE

For a wash flow filter in which a cylindrically-shaped filter is disposed in one of a pair of concentrically mounted fluid flow channels. A conically-shaped helically-wound spring is mounted concentrically in the other channel and is normally in compression so that the coils abut each other and block off the flow therethrough. The pressure drop across the spring generates a force to expand the spring so that the spaces between adjacent coils permits flow to pass therethrough. This optimizes the velocity of the fluid passing in the other channel to assure continuous cleaning of the filter device in an effective manner.

---

This invention relates to apparatus for filtering a fluid and, more particularly, to apparatus for regulating the rate of flow of contaminated fluid, a portion of which is filtered and another portion of which serves to clean the filter device.

In a filter system of the type contemplated herein, a fluid is allowed to flow across the filter for the purpose of continuously washing the filter screen to prevent clogging of same. Filter clogging will occur due to dirt built up in the filter screen should the wash rate of flow across the filter drop too low. On the other hand, dirt will become imbedded in the filter device and eventually destroy same when the wash rate of flow across the filter becomes too high. Heretofore difficulties occurred in trying to achieve an optimum wash fluid flow across the filter for large pressure variations or rate of fluid flow variations across such filter.

It is the object of the invention to regulate a wash filter system to provide a selected and substantially constant wash filter flow for cleaning the filter regardless of pressure and rate variations to the input bulk fluid flow to the system.

It is a further object of the invention to provide a wash flow for cleaning a filter system as contemplated herein wherein a bulk fluid flow is regulated to maintain a wash flow across the filter at an optimum value of velocity for insuring continuous cleaning of the filter device without damaging same.

Other objects and advantages will become apparent from the description and the drawing in which the figure shows a cross-sectional side view embodiment of the invention wherein the lengthwise axis of the embodiment is parallel with the direction of wash fluid flow in the system.

Reference is now made to the figure for a detailed description of an embodiment of the invention as applied to a jet power plant. Said power plant is depicted as a concentric casing structure 10 having a cylindrical inner wall 11. Wall 11 partitions a bulk fluid flow channel 12 of relatively large cross-sectional area from an outer wash flow channel 13. Channel 13 serves to conduct the flow of a wash fluid. The outer diameter boundary of wash fluid channel 13 includes a cylindrical fixed geometry fluid filter 14 of suitable screen gauge, for example, gauged to filter 40 micron particles. The opposite ends of filter 14 are supported by casing flanges 15, 15, which flanges 15, 15 provide a seal against fluid flow.

The illustrated embodiment serves to supply filter-cleaned fluid to a servo load. The filter-cleaned fluid is taken from a flow of unclean or particle contaminated bulk flow fluid, such as, the fuel normally fed to the engine from an input region 16. The flow pattern of the filter-cleaned fluid is depicted by arrows 17a, b, . . . 17f, etc. In other words, the filter-cleaned fluid supplied to the servo load is that portion of the fuel flowing along wash flow channel 13 which proceeds through filter 14 and thence through an opening 18 for further passage through conduit 19 to the servo load.

The contaminated bulk fluid from input region 16 is divided by partition 11 wherein the bulk flow proceeds as depicted by arrows 21 to a confronting annular and conical spring 22 normally tightly wound with adjacent turns 23 touching. Spring 22 serves as the orifice for restricting and otherwise regulating bulk flow along channel 12 and the rate of wash flow along channel 13 in accordance with the confronting cross-sectional area of the interstice openings between adjacent spring turns 23. Spring 22 is supported in bulk flow channel 12 and has an inner end suitably tied to a centralized casing structure 24. The outer spring end 25 is slidable along partition wall 11. Maximum extension of spring 22 is determined by an annular limit stop 26. Abutment of spring outer end 25 with stop 26 serves to limit maximum opening of the spring orifice.

The spring orifice forms two pressure regions depicted as P1 on the input flow side of spring 22 and P2 on the downward flow side of the spring orifice. The figure illustrates (in solid outline) the spring orifice in closed status without any interstices between adjacent spring turns 23 thereby precluding bulk fluid flow through channel 12. The spring interstices open when the pressure differential between P1 and P2 reaches a cracking pressure as determined by the preloaded parameters of the spring and the particular engine application. The amount of orifice opening is a function of pressure differential between P1 and P2 for values above the cracking pressure so as to allow a corresponding bulk flow (see arrow 27) through the opened spring depicted in dot-dash outline.

A wash filter flow will subsist down channel 13 from left to right, see arrows 20, and thus pass along filter screen 14 assuming the existence of a sufficient pressure differential between the opposite ends of channel 13. A portion of such wash fluid filters through screen 14 for passage to the servo load via aperture 18 and conduit 19. The contamination particles from the filtered fluid are sifted by screen 14 and are washed out therefrom by the continuous and concurrent wash flow along channel 13.

The regulation of bulk flow and wash flow in accordance with the invention compensates for variations of input fluid pressure at region 16. For example, should the fluid pressure drop at the input side of channel 13 to relatively low values, the rate of wash flow along channel 13 will not be sufficient to dislodge the contaminations collecting in screen 14. On the other hand, should the pressures in region 16 become excessivly high, the resulting high velocity wash flow along channel 13 will tend to imbed further the contaminations collecting in screen 14 rather than to dislodge same, and ultimately to clog or to destroy screen 14 unless the operation is interrupted to allow the screen to be cleaned out. The latter solution is not practicable for normal operation of jet power plants and the like.

It is the purpose of the invention to regulate the wash flow along channel 13, whereby its rate of flow (velocity) is maintained relatively constant, and at a value which insures a continuous wash cleaning of filter 14 whenever servo fluid is required. Such regulation insures a continuous cleaning of screen 14 regardless of variations of input pressure in region 16 and thus regardless of pressure differentials between P1 and P2. This result is achieved by the spring orifice hereinbefore described. Spring 22 is characterized to open and to close its interstices, respectively, in response to increases and decreases of the aforesaid pressure differentials (input pressure in region 16). In other words, an increase of the pressure differential due to an increase of pressure in region 16 is absorbed by an increase of bulk flow through channel 12 since the spring orifice therein responds by further opening of its interstices, thus maintaining relatively constant velocity and thus the rate of wash flow along channel 13. Conversely, a lowering of the described pressures effects a decrease of bulk flow through channel 12, thus closing the spring orifice openings to retain a relatively constant wash flow velocity. Essentially, the invention contemplates using the bulk flow in channel 12 as the means of regulating the wash flow velocity so as to maintain such velocity at an optimum value for insuring a continuous cleaning of the filter screen 14.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:
1. Wash filter apparatus for providing a desired wash filter flow comprising, first channel means having an orifice for passing bulk fluid flow from an input side of said orifice to a downward flow side of said orifice, second channel means for receiving a portion of said input bulk fluid flow and for conducting said flow as a wash fluid flow therealong, filter means communicating with said wash fluid flow for passing a portion of said last-mentioned flow through said filter while the remainder of said wash fluid flow passes along said filter for cleaning same and then proceeds to said downward flow side of said apparatus, and means including a spring member supported in said first channel means for varying said orifice and being normally in one operative status for restricting bulk flow through said orifice and further characterized to vary in gradations of open operative status in response to pressure differentials between said input and said downward flow sides for maintaining a substantially constant wash flow velocity in said second channel for cleaning said filter regardless of variations of input bulk flow rates, said orifice varying means comprising, a pre-loaded conical spring of multiple turns forming said orifice, the interstices between spring turns open and close in preselected response to pressure differentials between said input and downward flow sides of said spring for holding wash flow velocity relatively constant.

2. Apparatus as defined in claim 1 wherein, said orifice varying means comprising, a pre-loaded multiple turn conical spring forming said orifice and having one end tied to said first channel means and having another end slidable relative to said first-mentioned end for allowing the interstices between adjacent spring turns to close and to open in preselected response to pressure differentials between said input and downward flow sides of said spring for holding the wash flow velocity relatively constant.

References Cited

UNITED STATES PATENTS 3,109,809 11/1963 Verrando _____ 210—130
3,179,116 4/1965 Jacobs _____ 210—106 X
3,193,102 7/1965 Bottoms et al. _____ 210—137

REUBEN FRIEDMAN, *Primary Examiner.*

JOHN ADEE, *Assistant Examiner.*

U.S. Cl. X.R.
210—130, 137, 433